(12) United States Patent
Ye et al.

(10) Patent No.: US 10,511,464 B2
(45) Date of Patent: Dec. 17, 2019

(54) BAUD RATE TRACKING AND COMPENSATION APPARATUS AND METHOD

(71) Applicant: REALTEK SEMICONDUCTOR CORPORATION, Hsinchu (TW)

(72) Inventors: Bixing Ye, Nanjing (CN); Zuohui Peng, Suzhou (CN); Chaoming Li, Suzhou (CN); Qin Zhang, Suzhou (CN); Zhilin Wu, Kunshan (CN)

(73) Assignee: REALTEK SEMICONDUCTOR CORPORATION, Hsinchu (TW)

( * ) Notice: Subject to any disclaimer, the term of this patent is extended or adjusted under 35 U.S.C. 154(b) by 0 days.

(21) Appl. No.: 16/128,884

(22) Filed: Sep. 12, 2018

(65) Prior Publication Data

US 2019/0081828 A1   Mar. 14, 2019

(30) Foreign Application Priority Data

Sep. 13, 2017   (CN) .......................... 2017 1 0823589

(51) Int. Cl.
| | |
|---|---|
| *H04L 25/493* | (2006.01) |
| *H04L 7/04* | (2006.01) |
| *H04L 7/033* | (2006.01) |
| *H04L 25/02* | (2006.01) |
| *H04B 10/50* | (2013.01) |
| *H04B 10/69* | (2013.01) |

(Continued)

(52) U.S. Cl.
CPC .......... *H04L 25/493* (2013.01); *H04L 7/0331* (2013.01); *H04L 7/044* (2013.01); *H04L 25/0262* (2013.01); *H04B 10/40* (2013.01); *H04B 10/50* (2013.01); *H04B 10/60* (2013.01); *H04B 10/69* (2013.01); *H04B 10/691* (2013.01); *H04B 10/695* (2013.01)

(58) Field of Classification Search
None
See application file for complete search history.

(56) References Cited

U.S. PATENT DOCUMENTS 5,923,705 A   7/1999 Willkie et al.
5,982,837 A   11/1999 Earnest
(Continued)

OTHER PUBLICATIONS

Taiwan Intellectual Property Office, "Office Action", dated Apr. 12, 2018. Summary of the OA letter: render claims 1-10 obvious.

*Primary Examiner* — Darren E Wolf
(74) *Attorney, Agent, or Firm* — WPAT, PC (57) ABSTRACT

Disclosed is a baud rate tracking and compensation apparatus comprising: a clock generating component generating a clock; a sampling circuit sampling a reception signal according to the clock and thereby generating a sampled result, and the sampling circuit generating a transition notification signal when the sampled result indicates a transition of the reception signal; a clock counting circuit counting cycles of the clock between a first transition of the reception signal and a second transition of the reception signal according to the clock and the transition notification signal; a bit counting circuit counting bit(s) between the first transition and the second transition according to the clock and a bit cycle; and a calculation circuit dividing the number of the cycles by the number of the bit(s) to obtain a calculation value, and then updating the bit cycle according to the calculation value.

19 Claims, 8 Drawing Sheets

(51) Int. Cl.
    *H04B 10/60*     (2013.01)
    *H04B 10/40*     (2013.01)

(56) References Cited

U.S. PATENT DOCUMENTS

| | | |
|---|---|---|
| 6,366,610 B1 | 4/2002 | Loyer et al. |
| 7,006,561 B2 | 2/2006 | Lee |
| 7,613,211 B1 * | 11/2009 | Fagerlund .................. G06F 5/06 370/504 |
| 8,953,662 B1 | 2/2015 | Zhu et al. |
| 2006/0121933 A1 * | 6/2006 | Ikeda ..................... H04B 1/406 455/550.1 |
| 2006/0165200 A1 * | 7/2006 | Wagner ................... H04L 7/042 375/354 |
| 2012/0297233 A1 | 11/2012 | Ross |

* cited by examiner

BAUD RATE TRACKING AND COMPENSATION APPARATUS AND METHOD

BACKGROUND OF THE INVENTION

1. Field of the Invention

The present invention relates to a data reception process, especially to baud rate tracking and compensation of a data reception process.

2. Description of Related Art

Regarding certain communication techniques such as Universal Asynchronous Receiver/Transmitter (UART) communication technique, in order to ensure the efficiency and the correctness of data recovery, a receiver will determine a baud rate of a transmitter according to a training sequence of a prescribed pattern from the transmitter and then adopt the determined baud rate. However, the problem of the above-mentioned technique is that both the receiver and the transmitter have to possess the information of the transmission timing and the pattern of the training sequence in advance so as to allow the receiver to determine the baud rate. It should be noted that in a standard process of UART communication technique, a receiver and a transmitter should negotiate to adopt the same initial baud rate before they start communication, and after the receiver and the transmitter have initiated communication the receiver, in certain UART communication technique, will determine an actual baud rate of the transmitter according to a training sequence received from the transmitter so as to allow the receiver to calibrate itself by executing a process of baud rate calibration.

SUMMARY OF THE INVENTION

An objective of the present invention is to provide an apparatus and a method that are capable of making an improvement over the prior art.

Another objective of the present invention is to provide an apparatus and a method that are capable of carrying out baud rate tracking and compensation without any training sequence.

The apparatus according to an embodiment of the present invention includes a sampling circuit, a clock counting circuit, a bit counting circuit and a calculation circuit. The sampling circuit is configured to sample a reception signal according to a clock and generate a sampled result, the sampling circuit being configured to generate a transition notification signal when the sampled result indicates a transition of the reception signal. The clock counting circuit is configured to count cycles of the clock between a first transition of the reception signal and a second transition of the reception signal according to the clock and the transition notification signal. The bit counting circuit is configured to count bit(s) between the first transition and the second transition according to the clock and a bit cycle, the bit cycle being equal to or greater than a plurality of cycles of the clock. The calculation circuit is configured to divide the number of the cycles of the clock by the number of the bit(s) to obtain a calculation value, and thereby update the bit cycle according to the calculation value.

The method according to an embodiment of the present invention includes the following steps: generating a clock; sampling a reception signal according to the clock and generating a sampled result; generating a transition notification signal when the sampled result indicates a transition of the reception signal; counting cycles of the clock between a first transition of the reception signal and a second transition of the reception signal according to the clock and the transition notification signal; counting bit(s) between the first transition and the second transition according to the clock and a bit cycle, the bit cycle being equal to or greater than a plurality of cycles of the clock; and dividing the number of the cycles of the clock by the number of the bit(s) to obtain a calculation value, and then updating the bit cycle according to the calculation value.

These and other objectives of the present invention will no doubt become obvious to those of ordinary skill in the art after reading the following detailed description of the exemplary embodiments that are illustrated in the various figures and drawings.

DETAILED DESCRIPTION OF THE PREFERRED EMBODIMENTS

The present invention discloses an apparatus and a method for baud rate tracking and compensation. The apparatus and the method are capable of executing baud rate tracking and compensation without any training sequence, and thus can be used more easily. For better understanding, the embodiments in this specification are applicable to Universal Asynchronous Receiver/Transmitter (UART) communication technique; of course the present invention can be applied to other communication technique as long as such application is practicable. Since UART communication technique is known in this industrial field, the detail of this technique is omitted here provided the omitted detail has little to do with the understanding and enablement of the present invention. In addition, in the following description, the term "according to sth." can be interpreted as "according to the sth." or "according to a derivative of the sth."; and in the figures, a dotted/dashed line indicates an optional circuit connection, an optional signal, a distinguishing line, or the like.

Figure 1:
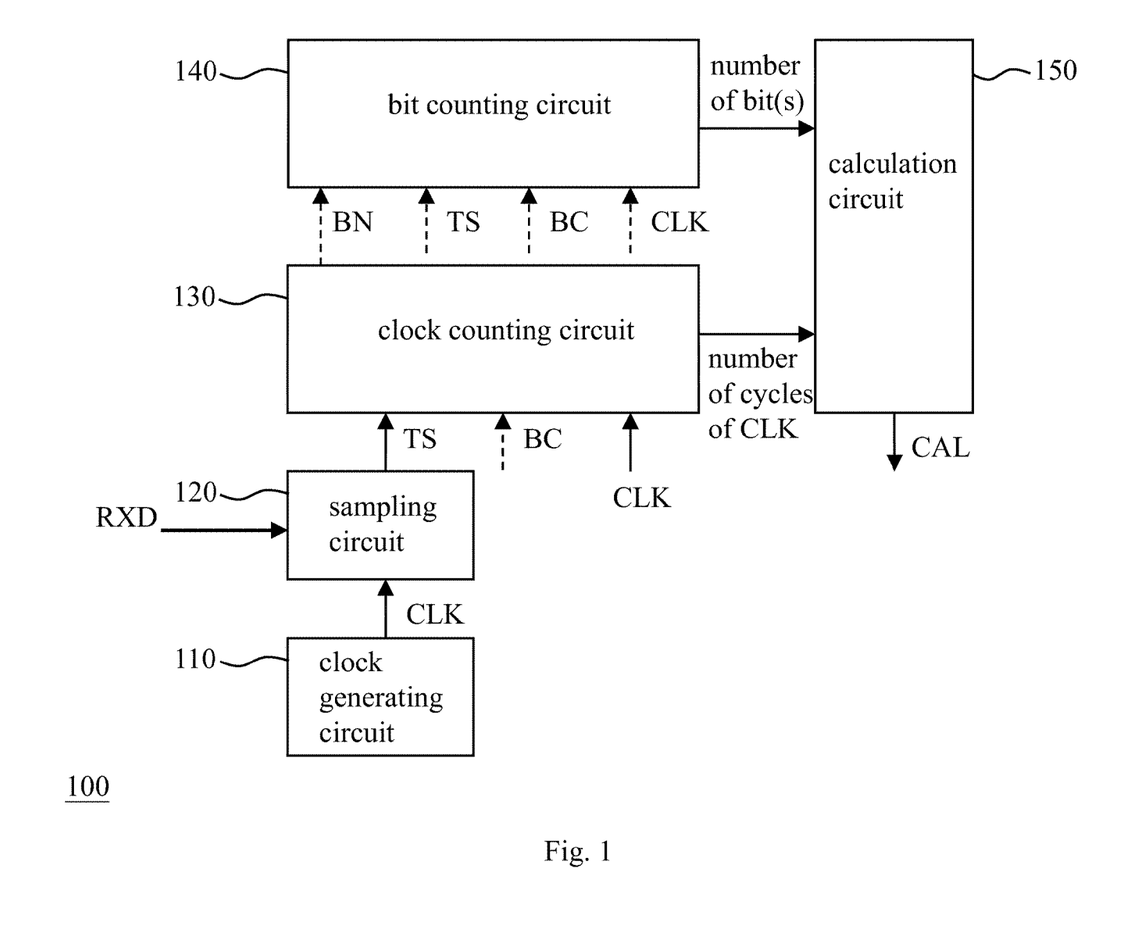
FIG. 1 shows an embodiment of the apparatus of the present invention.
Figure 2:
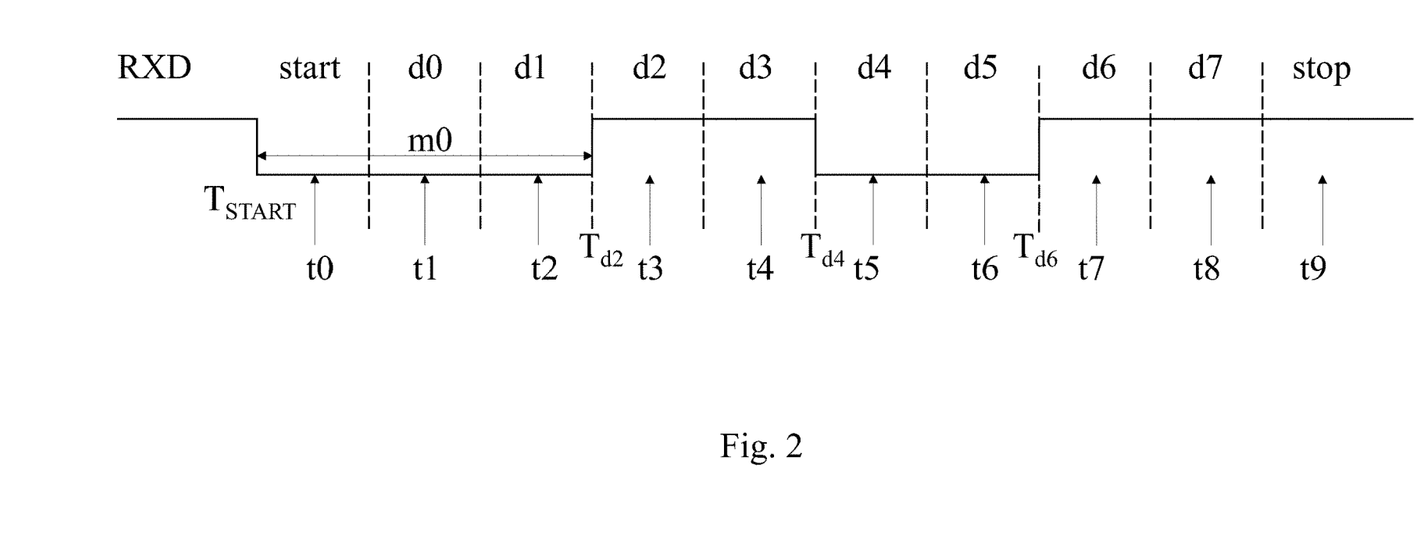
FIG. 2 shows an exemplary implementation of the reception signal sampled by FIG. 1's apparatus.
Figure 6:
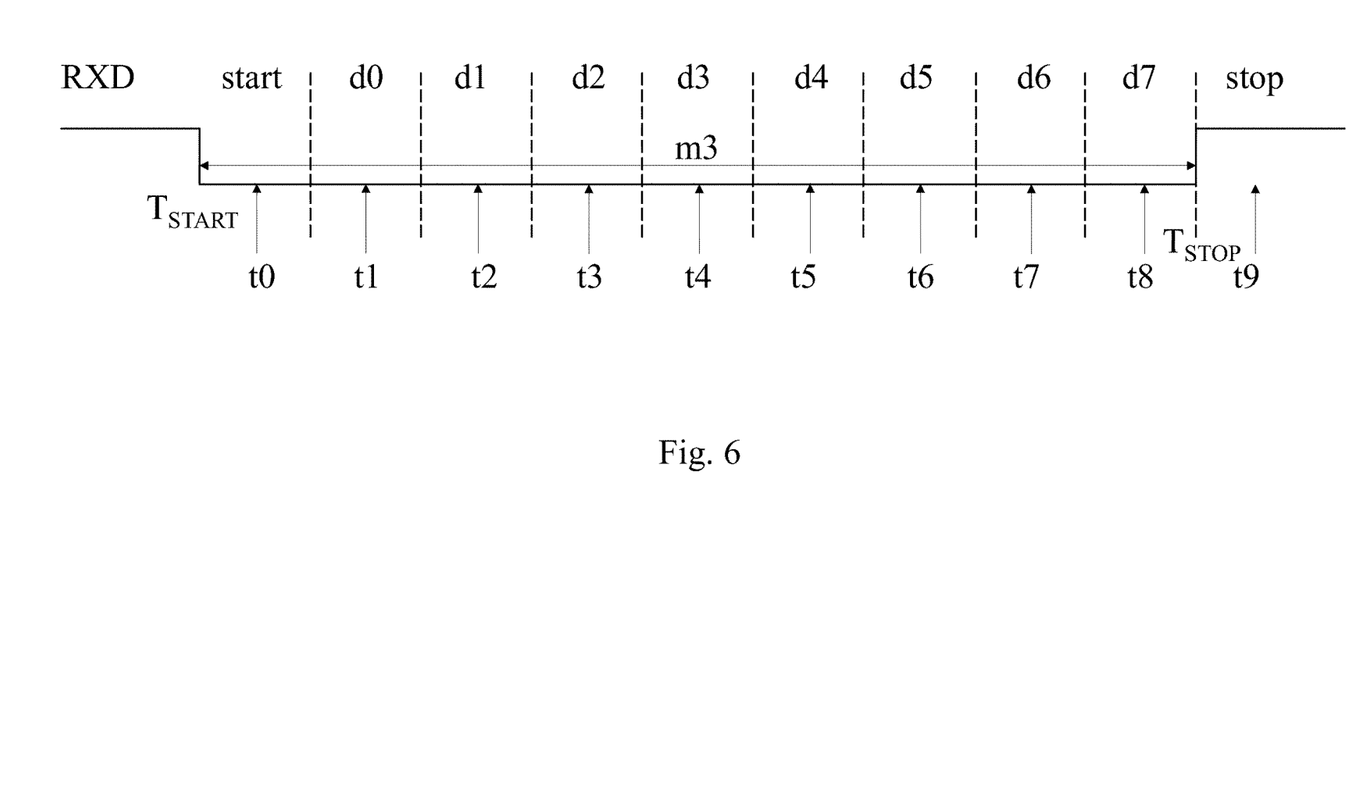
FIG. 6 shows another exemplary implementation of the reception signal sampled by FIG. 1's apparatus.

FIG. 1 shows an embodiment of the apparatus of the present invention. The apparatus 100 of FIG. 1 includes a clock generating component 110, a sampling circuit 120, a clock counting circuit 130, a bit counting circuit 140 and a calculation circuit 150. The clock generating component 110 is optional to the implementation of the apparatus 100, and configured to provide a clock (i.e., the label "CLK" in the figures), in which the frequency of the clock is higher than the baud rate and the bit rate of the apparatus 100; for instance, the frequency of the clock is N times the bit rate, in which N is a number between 2 and 10. The sampling circuit 120 is configured to sample a reception signal (i.e., the label "RXD" in the figures) and generate a sampled result; and the sampling circuit 120 is further configured to generate a transition notification signal (i.e., the label "TS" in the figures) when (e.g., every time, as soon as, right after . . . ) the sampled result indicates a transition of the reception signal (e.g., a rising and/or a falling edge(s) that can be determined by the sampling circuit 120 analyzing the variation of the reception signal according to a known art). The clock counting circuit 130 is configured to count cycles of the clock between a first transition of the reception signal and a second transition of the reception signal according to the clock and the transition notification signal, in which the first transition and the second transition could be two transitions of the reception signal that are not adjacent as shown in FIG. 2 or the first transition and the second transition could be two adjacent transitions of the reception signal as shown in FIG. 6; in addition, the clock counting circuit 130 could be optionally reset (e.g., by having the number, that is to say the amount, of the counted cycles return to zero) after the clock counting circuit 130 finishing counting the cycles of the clock. The bit counting circuit 140 is configured to count all bit(s) (which could be one or more bit(s)) between the first transition and the second transition according to the clock and a bit cycle (i.e., the label "BC" in the figures), the bit cycle being equal to or greater than a plurality of cycles of the clock; in other words, the length of the bit cycle is not less than the sum of the length of the said plurality of cycles, which means that the bit cycle is equivalent to an average cycle (i.e., a single cycle of the clock multiplied by "the number of the cycles of the clock divided by the number of the bit(s)") in connection with a single bit of the reception signal. Additionally, the bit counting circuit 140 could be optionally reset after it finishes counting the bit(s). The calculation circuit 150 is configured to divide the number (i.e., the amount) of the cycles of the clock by the number (i.e., the amount) of the bit(s) and thereby obtain a calculation value (i.e., the label "CAL" in the figures), and the calculating circuit 150 is further configured to update the bit cycle according to the calculate value. Since the above-mentioned reception signal is sent by a transmitter, by the above-described manner, the apparatus 100 is allowed to track the baud rate of the transmitter and compensate for the error of the baud rate of the apparatus 100 itself.

FIG. 2 shows an exemplary implementation of the reception signal sampled by the apparatus 100 of FIG. 1. As shown in FIG. 2, the reception signal includes a character, and the character includes a start bit (i.e., the label "start" in the figure), eight data bits (i.e., the labels "d0", "d1", . . . , "d6" and "d7" in the figure) and a stop bit (i.e., the label "stop" in the figure). When the sampling circuit 120 detects an initial transition of the start bit (as indicated by the label "$T_{START}$" in the figure), the sampling circuit 120 informs the clock counting circuit 130 to have it start counting, while the initial transition is treated as the aforementioned first transition; of course in another exemplary implementation, a transition (e.g., $T_{d2}$ or $T_{d4}$ in FIG. 2) behind the initial transition of the start bit can be treated as the first transition. In FIG. 2, when the sampled result is composed of M (e.g., an integer greater than one, such as an integer equal to "the bit cycle divided by two cycles of the clock") successive identical levels/values such as a plurality of successive "0", the sampling circuit 120 determines that the start bit is detected, and informs the clock counting circuit 130 to have it keep counting; when the sampled result is not composed of M successive identical levels/values such as a plurality of successive "0", the sampling circuit 120 determines that the start bit is not detected, and informs the clock counting circuit 130 to have it stop counting and be reset.

Please refer to FIG. 1 and FIG. 2. When the sampling circuit 120 detects an initial transition of the data bit "d2" (as indicated by the label "$T_{d2}$" in the figure), the sampling circuit 120 generates the aforementioned transition notification signal so as to have the clock counting circuit 130 count adjacent-transition cycles of the clock between the two adjacent transitions (i.e., $T_{START}$ and $T_{d2}$) of the reception signal according to the clock and the transition notification signal. In a similar way, the clock counting circuit 130 is able to count adjacent-transition cycles of the clock between every two adjacent transitions of the reception signal according to the clock and the transition notification signal, and therefore by executing a summing process to obtain the number (i.e., the amount) of all the adjacent-transition cycles of the clock, the clock counting circuit 130 can achieve counting the cycles of the clock between the first transition and the second transition.

Figure 3:
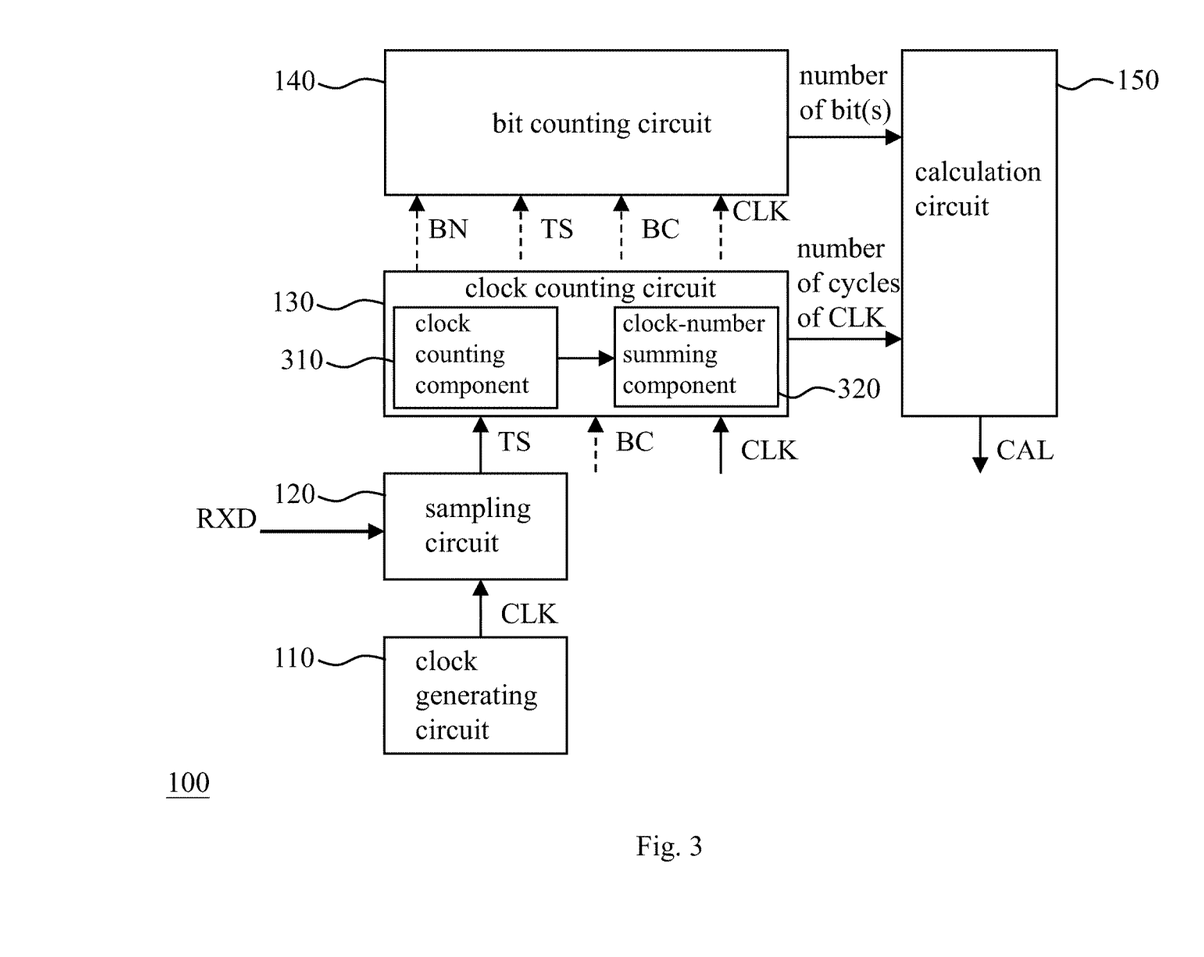
FIG. 3 shows an embodiment of the clock counting circuit of FIG. 1.

FIG. 3 shows an embodiment of the clock counting circuit 130 of FIG. 1. In FIG. 3, the clock counting circuit 130 includes a clock counting component 310 and a clock-number summing component 320. The clock counting component 310 is configured to count adjacent-transition cycles of the clock between every two adjacent transitions of the reception signal according to the clock and the transition notification signal within a duration between the first transition and the second transition; the clock counting component 310 is further configured to be reset after (or every time, or as soon as) it finishes counting the adjacent-transition cycles of the clock. The clock-number summing component 320 is configured to execute a summing process to obtain the number of all the adjacent-transition cycles of the clock between the first transition and the second transition (e.g., the clock-number summing component 320 summing a first number and a second number up to obtain the number of all the adjacent-transition cycles of the clock, in which the first number is the number of adjacent-transition cycles of the clock between the first transition and an intermediate transition of the reception signal and the second number is the number of adjacent-transition cycles of the clock between the intermediate transition and the second transition), and thereby generate the number of the cycles of the clock between the first transition and the second transition (i.e., treat the number of all the adjacent-transition cycles as the number of the cycles of the clock between the first transition and the second transition); the clock-number summing component 320 is further configured to be reset after (or every time, or as soon as) it generates the number of the cycles between the first transition and the second transition. It should be noted that in other embodiments of the clock counting circuit 130, the clock counting circuit 130 may count the cycles of the clock between the first transition and the second transition in light of other triggering events; for instance, if a current number of cycles of the clock counted by the clock counting circuit 130 is greater than a threshold, the clock counting circuit 130 treats the next transition notification signal as the notification signal indicating the second transition and accordingly counts the cycles of the clock between the first transition and the second transition without using the clock-number summing component 320; for another instance, the clock counting circuit 130 treats the $N^{th}$ transition notification signal as the notification signal indicating the second transition and accordingly counts the cycles of the clock between the first transition and the second transition without using the clock-number summing component 320, in which the N is an integer greater than one.

Please refer to FIG. 1 and FIG. 2. The clock counting circuit 130 can be optionally configured to generate at least one bit-number notification signal(s) (i.e., the label "BN" in the figure) according to the clock and the bit cycle, so as to have the bit counting circuit 140 count the bit(s) between the first transition and the second transition according to the at least one bit-number notification signal(s). For instance, if the bit cycle is equivalent to ten cycles of the clock (i.e., the value of the bit cycle "R" is ten), after the clock counting circuit 130 starts counting, the clock counting circuit 130 generates a bit-number notification signal when (or as soon as) the number of the counted cycles is equal to or greater than $$\frac{R}{2} = 5$$

(as indicated by the label "t0" in the figure); afterward, the clock counting circuit 130 simultaneously or later generates a bit-number notification signal every time the increment of the number of the counted cycles reaches R (i.e., ten) (as indicated by the labels "t1", "t2", . . . , "t8" and "t9" in the figure); consequently, the bit counting circuit 140 is capable of counting the bit(s) according to every bit-number notification signal (which could be understood as or equivalent to every transition of one bit-number notification signal). Provided the second transition is the initial transition (i.e., the label "$T_{d2}$" in FIG. 2) of the data bit d2, the clock counting circuit 130 generates a bit-number notification signal after (or right after) each of the sampling timings "t0", "t1" and "t2", so that the bit counting circuit 140 counts three bits in accordance with the three bit-number notification signals (which could be understood as or equivalent to three transitions of one bit-number notification signal); in the meantime, the number of the cycles counted by the clock counting circuit 130 between the first transition and the second transition is m0, and the calculation circuit 150 divides the number of the cycles (i.e., m0) by the number of the bit(s) (i.e., three) and obtains a calculation value $$\left(\text{i.e., } \frac{m0}{3}\right)$$

which is used to update the bit cycle. It should be noted that m0 is related to the baud rate of the character of the reception signal (i.e., the baud rate of the aforementioned transmitter), the calculation value is related to the baud rate of the apparatus 100, and m0 should be between 2.5R and 3.5R so as to ensure the number of the bit(s) counted by the bit counting circuit 140 being correct. In light of the above, in this exemplary implementation, the difference between the baud rate of the character of the reception signal and the baud rate of the apparatus 100 is set to a tolerance of $$\frac{(3R - 2.5R) \text{ or } (3.5R - 3R)}{3R} = \frac{0.5}{3} = 16.7\%.$$

Figure 4:
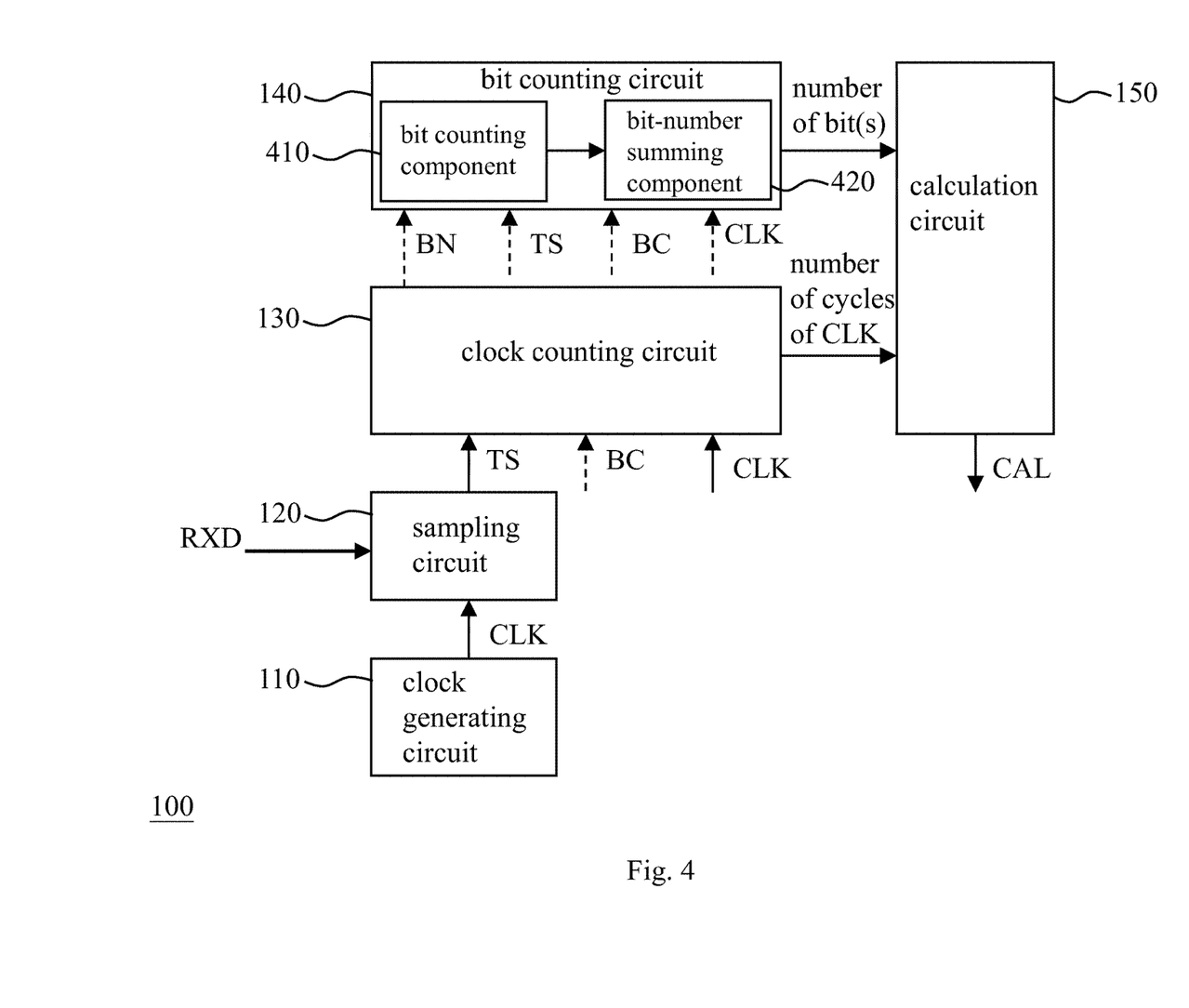
FIG. 4 shows an embodiment of the bit counting circuit of FIG. 1.

FIG. 4 shows an embodiment of the bit counting circuit 140 of FIG. 1. In FIG. 4, the bit counting circuit 140 includes a bit counting component 410 and a bit-number summing component 420. The bit counting component 410 is configured to count adjacent-transition bit(s) (which could be one or more bit(s)) between every two adjacent transitions of the reception signal according to the clock, the bit cycle and the transition notification signal within a duration between the first transition and the second transition. The bit counting component 410 can be optionally reset after (or every time) it finishes counting the adjacent-transition bit(s). The bit-number summing component 420 is configured to executing a summing process to obtain the number (i.e., the amount) of all the adjacent-transition bit(s) (e.g., the bit-number summing component 420 summing a first number and a second number up to obtain the number of all the adjacent-transition bits, in which the first number is the number of adjacent-transition bit(s) between the first transition and an intermediate transition of the reception signal and the second number is the number of adjacent-transition bit(s) between the intermediate transition and the second transition), and thereby generate the number of the bit(s) between the first transition and the second transition (i.e., treat the number of all the adjacent-transition bit(s) as the number of the bit(s) between the first transition and the second transition); the bit-number summing component 420 can be optionally reset after (or every time) it generates the number of the bit(s) between the first transition and the second transition. In this embodiment, the bit counting component 410 can count all adjacent-transition bit(s) between every two adjacent transitions of the reception signal according to the aforementioned bit-number notification signal (which is generated according to the clock and the bit cycle) and the transition notification signal; or the bit counting component 410 does not rely on any notification signal from the clock counting circuit 130, and generates the number of the adjacent-transition bit(s) directly according to the clock, the bit cycle and the transition notification signal. It should be noted that in other embodiments of the bit counting circuit 140, the bit counting circuit 140 may count the bit(s) between the first transition and the second transition in light of other triggering events; for instance, the bit counting circuit 140 counts the bit(s) between the first transition and the second transition according to the clock and the bit cycle, or according to the bit-number notification signal, while the bit-number summing component 420 is not necessary here.

Figure 5:
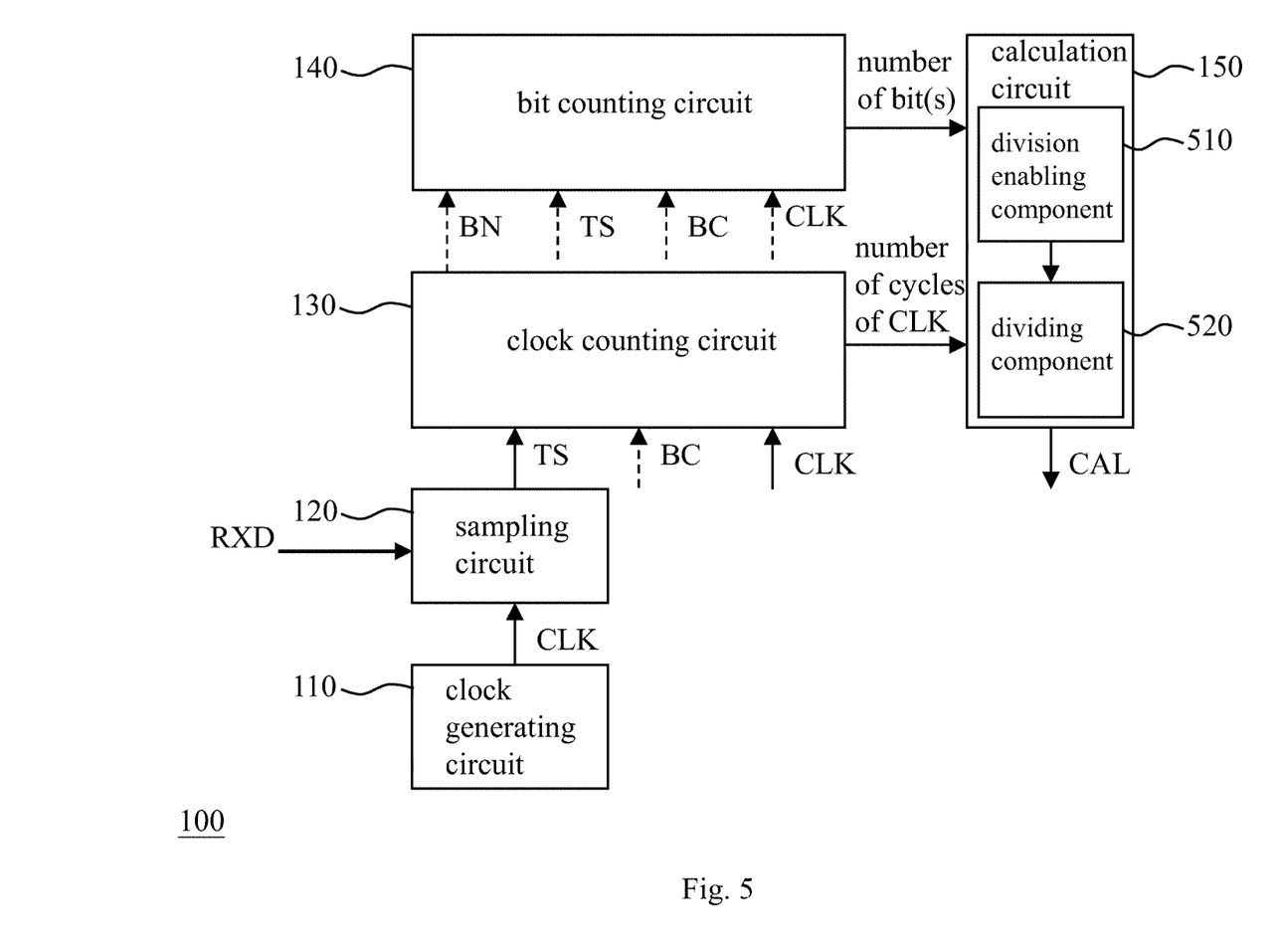
FIG. 5 shows an embodiment of the calculation circuit of FIG. 1.

FIG. 5 shows an embodiment of the calculation circuit 150 of FIG. 1. In FIG. 5, the calculation circuit 150 includes a division enabling component 510 and a dividing component 520. The division enabling component 510 is configured to compare a current number of bit(s) (e.g., a number of bit(s) obtained by the aforementioned bit-number summing component 420 executing a summing process) with a threshold. When the current number of bit(s) reaches the threshold, the current number of bit(s) is treated as the number of the bit(s) between the first transition and the second transition; in other words, the threshold decides the number of the bit(s) between the first transition and the second transition. More specifically, the higher the threshold, the more the number of the bit(s), and the calculation value obtained with such threshold can reflect a relatively long-term and stable baud rate of the reception signal (i.e., the baud rate of the aforementioned transmitter); on the other hand, the lower the threshold, the fewer the number of the bit(s), and the calculation value obtained with such threshold can immediately reflect a relatively short-term baud rate of the reception signal. In addition, the dividing component 520 is enabled by the division enabling component 510 when the division enabling component 510 finds the current number of bit(s) reaching the threshold, and then the dividing component 520 divides the number of the cycles of the clock by the number of the bit(s) to obtain the calculation value.

FIG. 6 shows another exemplary implementation of the reception signal sampled by the apparatus 100 of FIG. 1. As shown in FIG. 6, the reception signal (i.e., the label "RXD" in the figure) includes a character including one start bit (i.e., the label "start" in the figure), eight data bits (i.e., the labels "d0", "d1", . . . , "d6" and "d7" in the figure) and one stop bit (i.e., the label "stop" in the figure). When the sampling circuit 120 detects an initial transition (i.e., the label "$T_{START}$" in the figure) of the start bit, the sampling circuit 120 informs the clock counting circuit 130 to have it start counting, while the initial transition is treated as the first transition. When the sampling circuit 120 detects an initial transition (i.e., the label "$T_{STOP}$" in the figure) of the stop bit, the sampling circuit 120 generates the transition notification signal so as to have the clock counting circuit 130 determine adjacent-transition cycles of the clock between the two adjacent transitions (i.e., "$T_{START}$" and "$T_{STOP}$") of the reception signal according to the clock and the transition notification signal, while the initial transition of the stop bit is treated as the second transition. Accordingly, the clock counting circuit 130 is allowed to obtain the number of the cycles of the clock (i.e., the number of the adjacent-transition cycles of the clock in this case) between the first transition and the second transition. It should be noted that in this exemplary implementation, the clock counting circuit 130 can obtain a number of cycles "m3" by counting the cycles of the clock between the first transition and the second transition in the above-mentioned manner, and the bit counting circuit 140 can obtain a number of the bit(s) "nine" by counting the bit(s) between the first transition and the second transition in the above-mentioned manner; provided the value of the bit cycle is "R", m3 should be between 8.5R and 9.5R (because there are nine bits between the first transition and the second transition) so as to ensure the number of the bit(s) counted by the bit counting circuit 140 being correct. In light of the above, in this exemplary implementation, the difference between the baud rate of the character of the reception signal and the baud rate of the apparatus 100 is set to a tolerance of $$\frac{(9R-8.5R) \text{ or } (9.5R-9R)}{9R} = \frac{0.5}{9} = 5.6\%.$$

It should be noted that the pattern of the character is not limited to those in FIG. 2 and FIG. 6.

According to FIG. 2 and FIG. 6, the reception signal may include a part of a character between the first transition (e.g., the transition of the start bit "$T_{START}$") and the second transition (e.g., the transition of the data bit "$T_{d2}$") as shown in FIG. 2, or include a complete character between the first transition (e.g., the transition of the start bit "$T_{START}$") and the second transition (e.g., the transition of the stop bit "$T_{STOP}$") as shown in FIG. 6. Of course, through a proper setting (e.g., through properly setting the aforementioned threshold of the division enabling component 510), the reception signal can include a plurality of characters between the first transition and the second transition or include at least one character(s) and a part of a following character subsequent to the at least one character(s).

Figure 7:
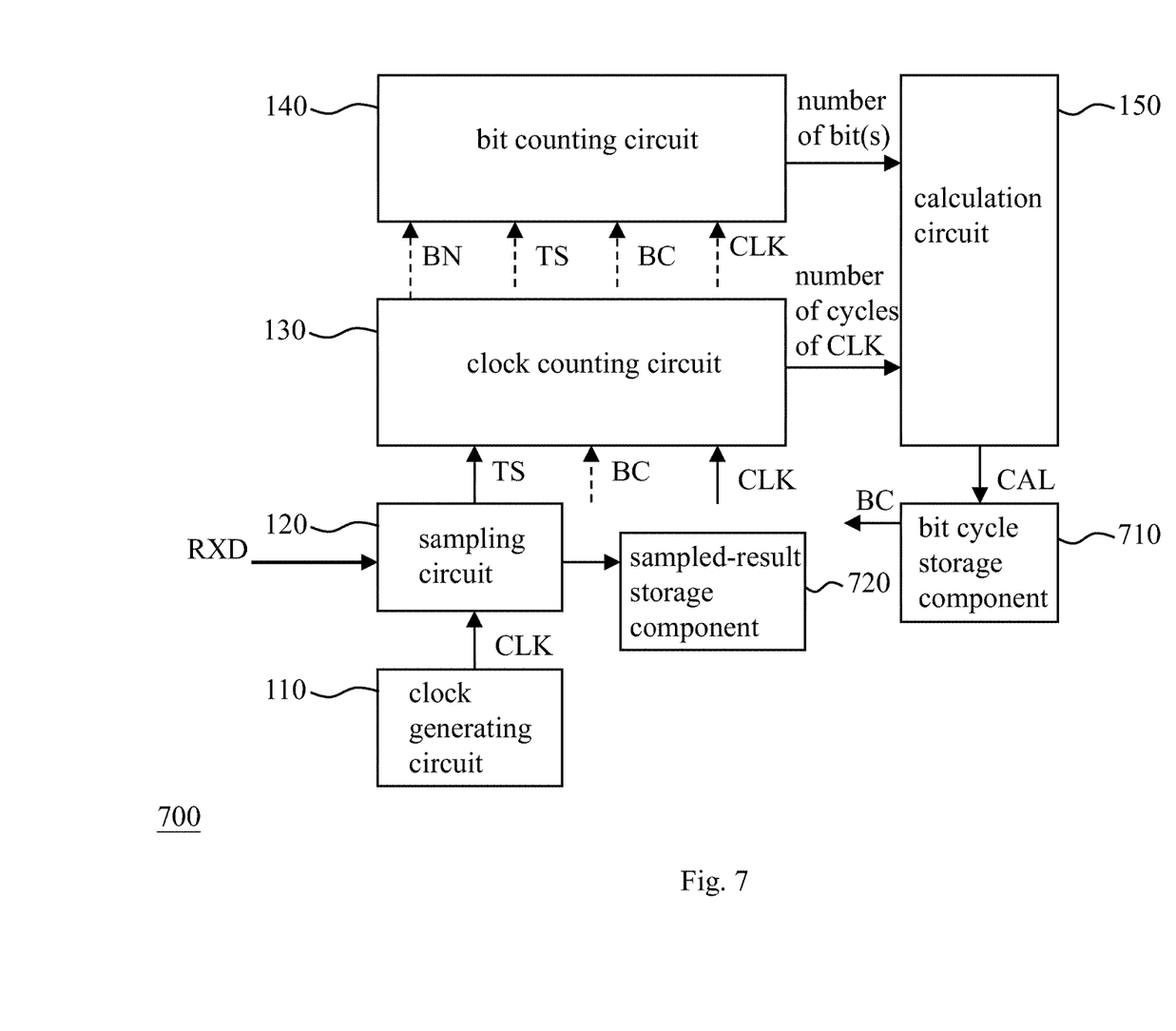
FIG. 7 shows another embodiment of the apparatus of the present invention.

FIG. 7 shows another embodiment of the apparatus of the present invention. In comparison with FIG. 1, the apparatus 700 of FIG. 7 further includes: a bit-cycle storage component 710 configured to store the bit cycle; and a sampled-result storage component 720 (e.g., a component composed of a shift register and a first-in-first-out (FIFO)) configured to store the sampled result. Since each of the bit-cycle storage component 710 and the sampled-result storage component 720 can be realized through a current art, the detail is omitted here. It should be noted that in the embodiments of FIG. 1 and FIG. 7, the reception signal between the first transition and the second transition does not include a training sequence dedicated to baud rate tracking and/or calibration; in other words, the embodiments of FIG. 1 and FIG. 7, unlike the prior art, can carry out baud rate tracking and compensation without any training sequence, which implies that the two embodiments can carry out baud rate tracking and compensation regardless of whether a training sequence exists. It should also be noted that in the embodiments of FIG. 1 and FIG. 7, the baud rate of the apparatus 100/700 will be set to be identical to the baud rate of the aforementioned transmitter from which transmits the reception signal.

Figure 8:
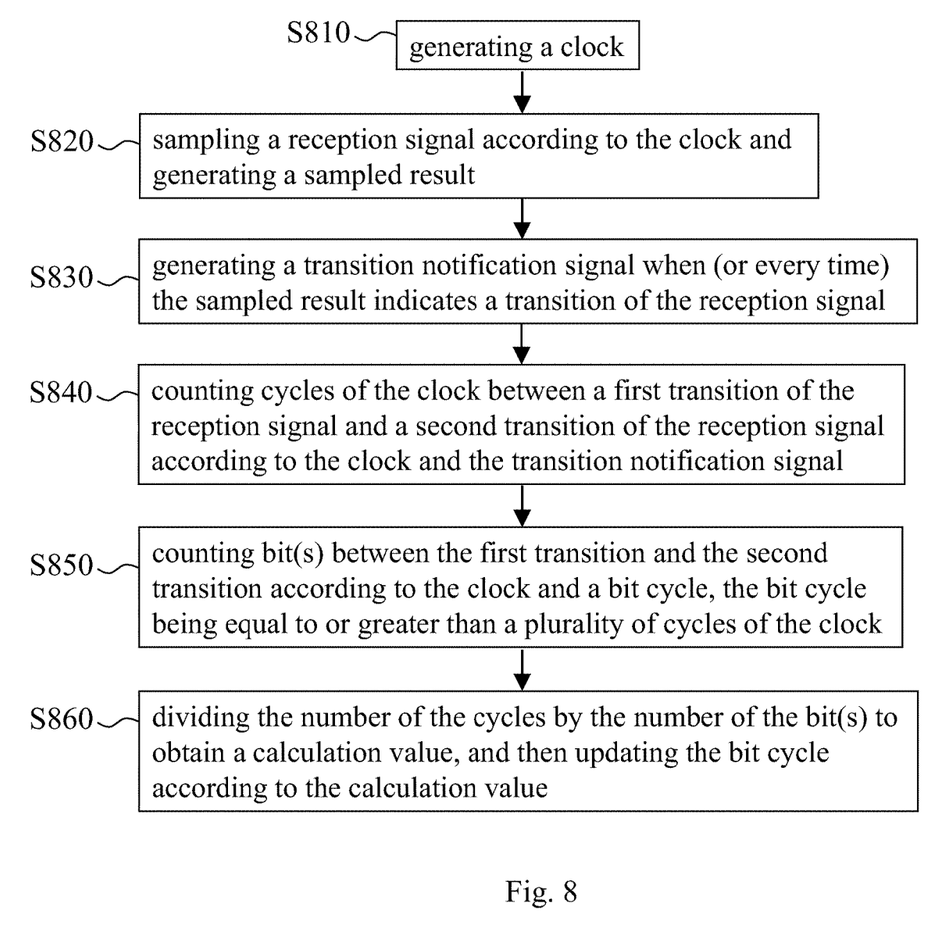
FIG. 8 shows an embodiment of the method of the present invention.

FIG. 8 shows an embodiment of the method of the present invention. The method can be carried out by the apparatus of the present invention or an equivalent thereof. As shown in FIG. 8, the embodiment includes the following steps:

Step S810: generating a clock. This step can be carried out by the clock generating component 110 of FIG. 1.

Step S820: sampling a reception signal according to the clock and generating a sampled result. This step can be carried out by the sampling circuit 120 of FIG. 1.

Step S830: generating a transition notification signal when (or every time) the sampled result indicates a transition of the reception signal. This step can be carried out by the sampling circuit 120 of FIG. 1.

Step S840: counting cycles of the clock between a first transition of the reception signal and a second transition of the reception signal according to the clock and the transition notification signal. This step can be carried out by the clock counting circuit 130 of FIG. 1.

Step S850: counting bit(s) between the first transition and the second transition according to the clock and a bit cycle, the bit cycle being equal to or greater than a plurality of cycles of the clock. This step can be carried out by the bit counting circuit 140 of FIG. 1.

Step S860: dividing the number of the cycles by the number of the bit(s) to obtain a calculation value, and then updating the bit cycle according to the calculation value. This step can be carried out by the calculation circuit 150 of FIG. 1.

Since those of ordinary skill in the art can appreciate the detail and the modification of the method embodiment of FIG. 8 by referring to the disclosure of the aforementioned apparatus embodiments, which means that every feature of the apparatus embodiments can be applied to the method embodiment in a reasonable way, therefore repeated and redundant description having little to do with the understanding and enablement of the present invention is omitted here.

To sum up, the present invention in comparison with the prior art may carry out baud rate tracking and compensation without any training sequence, and thus is more robust.

The aforementioned descriptions represent merely the exemplary embodiments of the present invention, without any intention to limit the scope of the present invention thereto. Various equivalent changes, alterations, or modifications based on the claims of the present invention are all consequently viewed as being embraced by the scope of the present invention.

What is claimed is:

1. An apparatus comprising:
a sampling circuit configured to sample a reception signal according to a clock and generate a sampled result, the sampling circuit being configured to generate a transition notification signal when the sampled result indicates a transition of the reception signal;
a clock counting circuit configured to count cycles of the clock between a first transition of the reception signal and a second transition of the reception signal according to the clock and the transition notification signal and to generate a number of the cycles of the clock between the first transition of the reception signal and the second transition of the reception signal;
a bit counting circuit configured to count bit(s) between the first transition and the second transition according to the clock and a bit cycle indicative of cycles of the clock per bit, so as to generate a number of the bit(s) between the first transition of the reception signal and the second transition of the reception signal; and
a divisional circuit configured to update the bit cycle with a calculation value obtained by dividing the number of the cycles of the clock by the number of the bit(s).

2. The apparatus of claim 1, wherein the clock counting circuit is further configured to generate at least one bit-number notification signal(s) according to the clock and the bit cycle, and the bit counting circuit is configured to count the bit(s) between the first transition and the second transition according to the at least one bit-number notification signal(s) in addition to the clock and the bit cycle.

3. The apparatus of claim 2, wherein the bit counting circuit includes:
a bit counting component configured to count adjacent-transition bit(s) between every two adjacent transitions of the reception signal according to the at least one bit-number notification signal(s) and the transition notification signal within a duration between the first transition and the second transition; and
a bit-number summing component configured to obtain a number of the adjacent-transition bit(s), and thereby generate the number of the bit(s) between the first transition and the second transition.

4. The apparatus of claim 1, wherein the clock counting circuit includes:
a clock counting component configured to count adjacent-transition cycles of the clock between every two adjacent transitions of the reception signal according to the clock and the transition notification signal within a duration between the first transition and the second transition; and
a clock-number summing component configured to obtain a number of the adjacent-transition cycles of the clock, and thereby generate the number of the cycles of the clock between the first transition and the second transition.

5. The apparatus of claim 4, wherein the clock counting component is further configured to generate at least one bit-number notification signal(s) according to the clock and the bit cycle, and the bit counting circuit is further configured to count the bit(s) between the first transition and the second transition according to the at least one bit-number notification signal(s) in addition to the clock and the bit cycle.

6. The apparatus of claim 4, wherein the clock counting component is reset every time the clock counting component finishes counting the adjacent-transition cycles of the clock, and the clock-number summing component is reset after generating the number of the cycles of the clock between the first transition and the second transition.

7. The apparatus of claim 1, wherein the bit counting circuit includes:
a bit counting component configured to count adjacent-transition bit(s) between every two adjacent transitions of the reception signal according to the clock, the bit cycle and the transition notification signal within a duration between the first transition and the second transition; and
a bit-number summing component configured to obtain a number of the adjacent-transition bit(s) and thereby generate the number of the bit(s) between the first transition and the second transition.

8. The apparatus of claim 7, wherein the bit counting component is reset every time the bit counting component finishes counting the adjacent-transition bit(s), and the bit-number summing component is reset after generating the number of the bit(s) between the first transition and the second transition.

9. The apparatus of claim 1, wherein the calculation circuit includes:
a division enabling component configured to compare a current number of bit(s) with a threshold, in which the current number of bit(s) is generated by the bit counting circuit, and when the current number of bit(s) reaches the threshold, the current number of bit(s) is treated as the number of the bit(s) between the first transition and the second transition; and
a dividing component configured to be enabled by the division enabling component when the current number of bit(s) reaches the threshold, and the dividing component configured to divide the number of the cycles by the number of the bit(s) to obtain the calculation value.

10. The apparatus of claim 1, further comprising: a bit-cycle storage component configured to store the bit cycle; and a sampled-result storage component configured to store the sampled result.

11. The apparatus of claim 1, wherein the clock counting circuit is reset after finishing counting the cycles of the clock, and the bit counting circuit is reset after finishing counting the bit(s).

12. The apparatus of claim 1, wherein the reception signal between the first transition and the second transition includes no training sequence dedicated to baud rate tracking and/or calibration.

13. A method comprising:
generating a clock;
sampling a reception signal according to the clock and generating a sampled result;
generating a transition notification signal when the sampled result indicates a transition of the reception signal;
counting cycles of the clock between a first transition of the reception signal and a second transition of the reception signal according to the clock and the transition notification signal and generating a number of the cycles of the clock between the first transition and the second transition;
counting bit(s) between the first transition and the second transition according to the clock and a bit cycle indicative of cycles of the clock per bit and thereby generating a number of the bit(s) between the first transition and the second transition; and
updating the bit cycle with a calculation value obtained by dividing the number of the cycles of the clock by the number of the bit(s).

14. The method of claim 13, wherein the step of generating the number of the cycles includes:

counting adjacent-transition cycles of the clock between every two adjacent transitions of the reception signal according to the clock and the transition notification signal within a duration between the first transition and the second transition; and executing a summing process to obtain of the number of the adjacent-transition cycles of the clock, and thereby generating the number of the cycles between the first transition and the second transition.

15. The method of claim 13, wherein the step of generating the number of the bit(s) includes:

counting adjacent-transition bit(s) between every two adjacent transitions of the reception signal according to the clock, the bit cycle and the transition notification signal within a duration between the first transition and the second transition; and executing a summing process to obtain a number of the adjacent-transition bit(s), and thereby generating the number of the bit(s) between the first transition and the second transition.

16. The method of claim 13, wherein the step of obtaining the calculating value includes:

counting a current number of bit(s) according to the clock and the bit cycle within a duration between the first transition and the second transition;

comparing the current number of bit(s) with a threshold, in which when the current number of bit(s) reaches the threshold, the current number of bit(s) is treated as the number of bit(s) between the first transition and the second transition; and when the current number of bit(s) reaches the threshold, dividing the number of the cycles by the number of the bit(s) to obtain the calculation value.

17. The method of claim 13, further comprising:

detecting a start bit of the reception signal, and when the start bit is detected, treating an initial transition of the start bit as the first transition.

18. The method of claim 13, further comprising: before generating the sampled result, having a baud rate of an apparatus be the same as a baud rate of a transmitter, in which the reception signal originates from the transmitter.

19. The method of claim 13, wherein the reception signal between the first transition and the second transition includes no training sequence dedicated to baud rate tracking and/or calibration.

\* \* \* \* \*